United States Patent
Wang et al.

(10) Patent No.: US 8,879,341 B2
(45) Date of Patent: Nov. 4, 2014

(54) METHOD FOR OPERATING MEMORY SYSTEM IN RING TOPOLOGY

(75) Inventors: Weixin Wang, Suwon-si (KR);
 Hee-Chang Cho, Seoul (KR); Il-Su Han, Incheon (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 9 days.

(21) Appl. No.: 13/612,570

(22) Filed: Sep. 12, 2012

(65) Prior Publication Data

US 2013/0148440 A1  Jun. 13, 2013

(30) Foreign Application Priority Data

Dec. 8, 2011  (KR) .................... 10-2011-0131129

(51) Int. Cl.
 *G11C 7/00* (2006.01)
(52) U.S. Cl.
 USPC .................................................... 365/189.18
(58) Field of Classification Search
 CPC ........... G11C 7/00; G11C 7/1048; G11C 7/10
 USPC .................................................... 365/189.18
 See application file for complete search history.

(56) References Cited

U.S. PATENT DOCUMENTS

| 6,650,618 | B1 | 11/2003 | Peng et al. |
| 6,658,509 | B1 * | 12/2003 | Bonella et al. ................ 710/100 |
| 2005/0265238 | A1 | 12/2005 | Mattina |
| 2010/0115217 | A1 * | 5/2010 | Oh et al. ...................... 711/162 |

FOREIGN PATENT DOCUMENTS

| KR | 10-2004-0045673 | 6/2004 |
| WO | WO 99/55045 | 10/1999 |

OTHER PUBLICATIONS

English Abstract for Publication No. 10-2004-0045673.

* cited by examiner

*Primary Examiner* — Anthan Tran
(74) *Attorney, Agent, or Firm* — F. Chau & Associates, LLC

(57) ABSTRACT

A method for operating a memory system includes providing a memory system including a memory controller, and first and second memory devices constituting a ring topology. The memory controller is connected to the first memory device through first and second links. The second memory device is disposed on the first link. The first memory device starts a first operation. The first link is used as a communication path between the first memory device and the memory controller. The second memory device starts a second operation before the first memory device completes the first operation. The communication path between the first memory device and the memory controller is changed into the second link. The first link is used as a communication path between the second memory device and the memory controller.

14 Claims, 10 Drawing Sheets

METHOD FOR OPERATING MEMORY SYSTEM IN RING TOPOLOGY

CROSS-REFERENCE TO RELATED APPLICATION

This application claims priority under 35 U.S.C. §119 to Korean Patent Application No. 10-2011-0131129, filed on Dec. 8, 2011 in the Korean. Intellectual Property Office, the contents of which in its entirety are herein incorporated by reference.

TECHNICAL FIELD

The present disclosure relates to a memory system, and more particularly, to a method for operating a memory system in a ring topology.

DISCUSSION OF THE RELATED ART

A memory system complying with flash memory standards, such as an embedded MMC (eMMC) 4.5 or a UNIX file system (UFS) 1.0, has a 1:1 matching system architecture. According to this architecture, a single memory controller is matched to only one memory device and a single memory device is only matched to one controller.

Other memory systems may utilize a 1:n matching system architecture. In such an architecture, a single memory controller may be matched to multiple memory devices In particular, in a memory system complying with the UHS-II version 1.0 standards, a memory controller and multiple memory devices constitute a ring topology.

In order for a memory device to perform either a read operation or a write operation, a communication path is secured between a memory device and a memory controller. In addition, signals such as data or commands may be transmitted through the secured communication path.

However, in the memory system having a ring topology, that includes a memory controller and multiple memory devices, the multiple memory devices may simultaneously perform operations. In this case, it may be difficult to secure a new path between a new memory device and the controller while an existing memory device is in the process of performing an operation. Therefore, performance of the new operation of the new memory device may be delayed until the operation of the existing memory device is completed. For this reason, the processing speed of the overall operation of the memory system may be reduced.

SUMMARY

Exemplary embodiments of the present invention provide a method for operating a memory system in a ring topology, which has an increased processing speed for memory device operations.

The above and other features of exemplary embodiments of the present invention will be described in or be apparent from the following description.

According to an aspect of the present invention, there is provided a method for operating a memory system. The method includes providing a memory system including a memory controller, and first and second memory devices, constituting a ring topology. The memory controller is connected to the first memory device through first and second links and the second memory device disposed on the first link. Accordingly, the first memory device is allowed to start a first operation. The first link is used as a communication path between the first memory device and the memory controller. The first link allows the second memory device to start a second operation before the first memory device completes the first operation. The communication path between the first memory device and the memory controller is changed into the second link and the first link is used as a communication path between the second memory device and the memory controller.

According to an aspect of the present invention, there is provided a method for operating a memory system. The method includes providing a memory system including a memory controller, and first to third memory devices constituting a multi-ring topology. The memory controller is connected to a first ring type link having first directionality and a second ring type link having second directionality. The first to third memory devices are disposed on the first and second ring type links. The first and second memory devices are allowed to start first and second operations. The first ring type link is used as a communication path between the first memory device and the memory controller. The second ring type link is used as a communication path between the second memory device and the memory controller. The third memory device is allowed to start a third operation before the first and second memory devices complete the first and second operations. The communication path between the first memory device and the memory controller is changed into the second ring type link. The first ring type link is used as a communication path between the third memory device and the memory controller.

According to an aspect of the present invention, a first operation is initiated in a first memory device using a memory controller that is in communication with the first memory device through a first link and a second link different from the first link. The first operation uses the first link as its communication path. A second operation is initiated in a second memory device using the memory controller that is in communication with the second memory device through the first link and the second link. The initiation of the second operation occurs before the first memory device completes the first operation. The communication path of the first operation is changed from the first link to the second link. The second operation uses the first link as its communication path.

According to an aspect of the present invention, a memory system includes a memory controller, a first memory device, and a second memory device. The memory controller is connected to the first memory device along a first link and a second link different from the first link. The memory controller is connected to the second memory device along the first link and the second link. The memory controller is configured to initiate a first operation in the first memory device along the first link, switch the first operation from the first link to the second link, and initiate a second operation in the second memory device along the first link before said first operation has completed

BRIEF DESCRIPTION OF THE DRAWINGS

The above and other features and aspects of exemplary embodiments of the present invention will become more apparent by the description provided below with reference to the attached drawings in which.

DETAILED DESCRIPTION OF THE EMBODIMENTS

Figure 1:
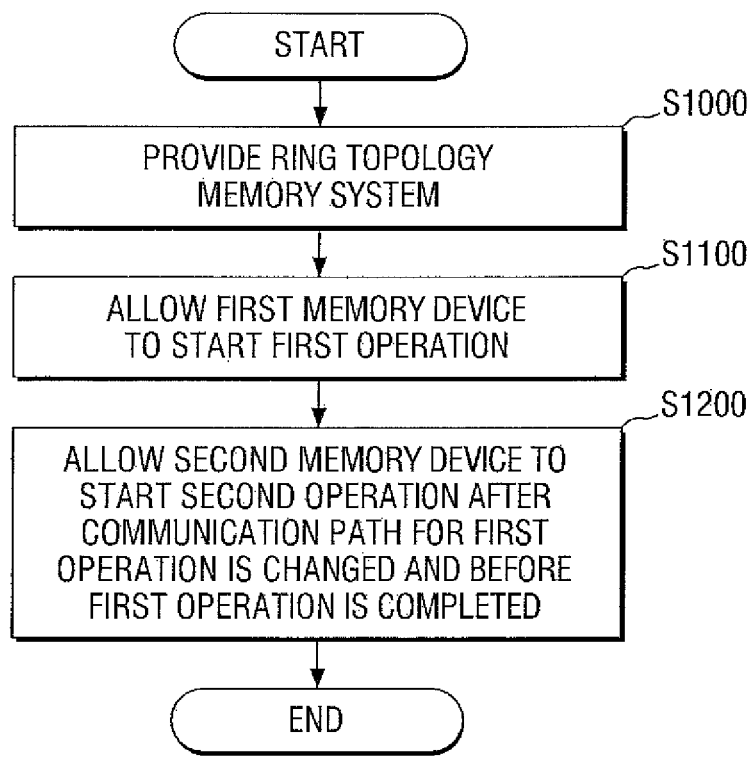
FIG. 1 is a flowchart illustrating a method for operating a memory system according to an exemplary embodiment of the present invention.

Aspect and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. In the drawings, the thickness of layers and regions may be exaggerated for clarity.

It will be understood that when an element or layer is referred to as being "connected to," or "coupled to" another element or layer, it can be directly connected to or coupled to another element or layer or intervening elements or layers may be present. Like numbers may refer to like elements throughout.

Figure 2:
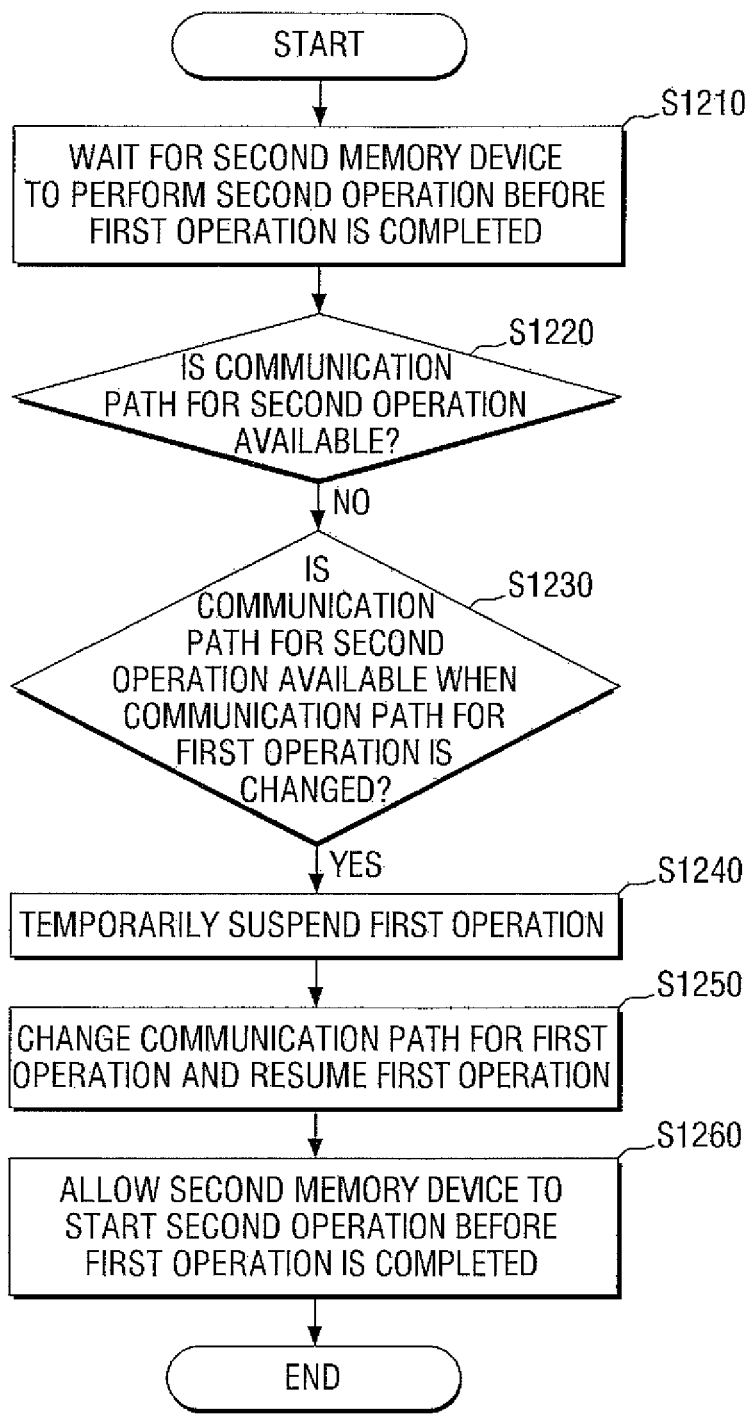
FIG. 2 is a flowchart illustrating Step S1200 of FIG. 1.

Hereinafter, a method for operating a memory system in a ring topology according to an exemplary embodiment of the present invention will be described with reference to FIGS. 1 to 6. FIG. 1 is a flowchart illustrating a method for operating a memory system according to an exemplary embodiment of the present invention. FIG. 2 is a flowchart illustrating Step S1200 of FIG. 1. FIGS. 3 to 6 illustrate memory systems for performing a method for operating a memory system according to an exemplary embodiment of the present invention.

Figure 3:
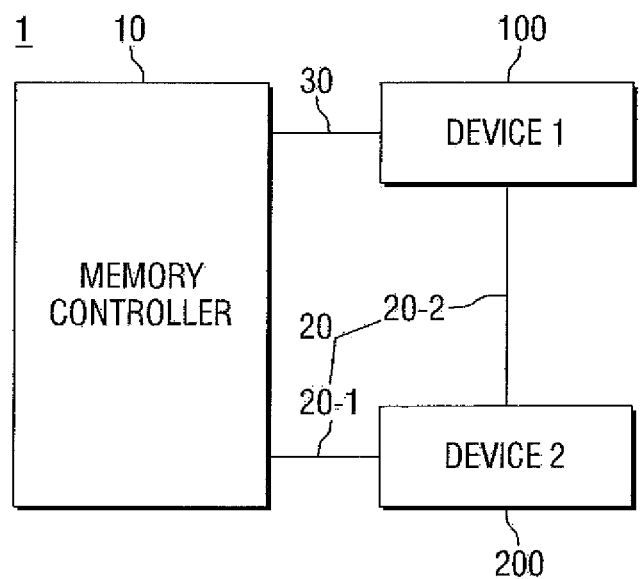
FIGS. 3 to 6 illustrate memory systems for performing a method for operating a memory system according to exemplary embodiments of the present invention.

Referring to FIGS. 1 to 3, a ring topology memory system 1 is provided (S1000).

The memory system 1 includes a memory controller 10, a first memory device 100, and a second memory device 200. The memory controller 10 and the memory devices 100 and 200 form a ring topology. For example, each object is connected to two other objects. The memory controller 10 is connected to both the first device 100 and the second device 200, the first device 100 is connected to both the memory controller 10 and the second device 200, and the second device 200 is connected to both the first device 100 and the memory controller 10. The memory controller 10 may be connected to the first memory device 100 through a first link 20 and a second link 30. In addition, the second memory device 200 may be positioned on the first link 20.

The memory system 1 may have a 1:n matching system architecture in which a single memory controller 10 is matched to multiple memory devices 100 and 200. The memory controller 10 may control first and second memory devices 100 and 200. The first and second memory devices 100 and 200 may be flash memory devices, but aspects of the present invention are not limited thereto.

The first link 20 may be defined as a communication path between the memory controller 10 and the first memory device 100. The first link 20 may include a first sub link 20-1 and a second sub link 20-2. In addition, the first sub link 20-1 may be defined as a communication path between the memory controller 10 and the second memory device 200, and the second sub link 20-2 may be defined as a communication path between the first memory device 100 and the second memory device 200. However, the memory system 1 of the present invention is not limited to that shown in FIG. 3, and each of the first and second sub links 20-1 and 20-2 may include a plurality of sub links. In addition, different memory devices may be positioned on the first and second sub links 20-1 and 20-2.

The second link 30 may be defined as a communication path between the memory controller 10 and the first memory device 100. The second link 30 and the first link 20 may be different communication paths. The second link 30 may include a plurality of sub links, in a manner similar to the way the first link 20 includes a plurality of sub links. In addition, different memory devices may be positioned on the second link 30.

In the memory system 1, the memory controller 10, and the first and second memory devices 100 and 200 may perform half duplex communication in which communication can only occur in one direction at a time. For example, the first and second links 20 and 30 may be communication paths for half duplex communication, and one link may transmit one single at a time. Aspects of the present invention are not limited to this configuration. Alternatively, the memory system 1 may perform full duplex communication, which is described below.

Figure 4:
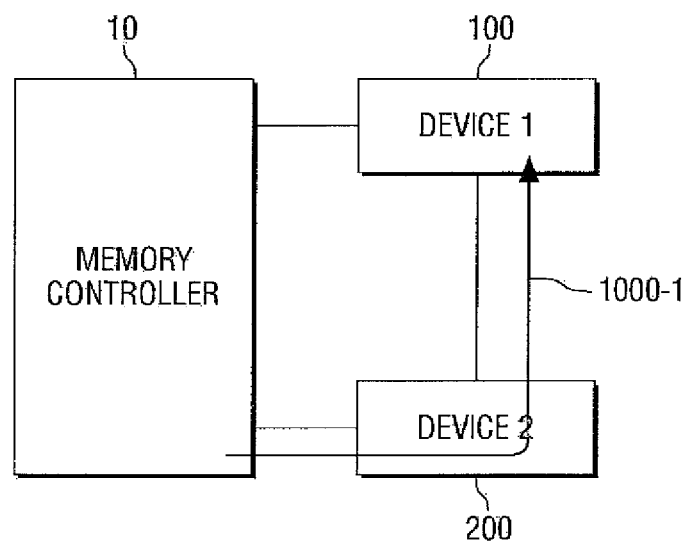

Referring to FIGS. 1 and 4, the first memory device 100 starts a first operation (S1100).

For example, the first memory device 100 starts the first operation and the first link 20 may be used as a communication path 1000-1 between the first memory device 100 and the memory controller 10. The first operation may be a read operation or a write operation. FIG. 4 illustrates that the first operation is a write operation. For example, the memory controller 10 transmits data to be written on the first memory device 100 through the first link 20 in a first direction (e.g., in a counterclockwise direction), and the first memory device 100 is able to perform the first operation (e.g., a write operation) based on the transmitted data.

Figure 6:
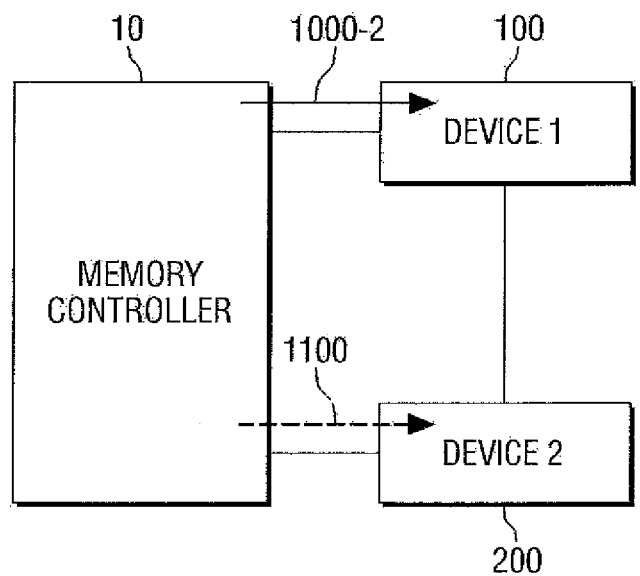

Next, referring to FIGS. 1 and 6, a communication path 1000-2 for the first operation is changed, and the second memory device 200 starts the second operation before the first memory device 100 completes the first operation (S1200).

For example, the first memory device 100 performs the first operation, and the communication path 1000-2 between the first memory device 100 and the memory controller 10 may be changed. For example, the second link 30 may be used as the communication path 1000-2 between the first memory device 100 and the memory controller 10. As the communication path 1000-2 between the first memory device 100 and the memory controller 10 is changed, a data transmission direction may also be changed. For example, the memory controller 10 may transmit data to be written to the first memory device 100 through the second link 30 in a second direction (e.g., in a clockwise direction).

In addition, before the first memory device 100 completes the first operation, the second memory device 200 starts the second operation, thereby simultaneously performing the first and second operations. The second operation may either be a read operation or a write operation. FIG. 6 illustrates a case where the second operation is a write operation. A first sub link 20-1 of the first link 20 may be used as a communication path 1100 between the second memory device 200 and the memory controller 10.

Effects of this configuration of exemplary embodiments of the present invention will be described with reference to FIGS. 4 and 6.

Referring to FIG. 4, while the first memory device 100 performs the first operation, the first link 20 is used as the communication path 1000-1 between the first memory device 100 and the memory controller 10. The second memory device 200 may perform communication using the first and second sub links 20-1 and 20-2. The first and second sub links 20-1 and 20-2 may be used as the communication path 1000-1 for the first operation. Since the second memory device 200 cannot secure a path enabling communication with the memory controller 10, the read operation or the write operation may not be performed.

However, referring to FIG. 6, the communication path 1000-2 between the first memory device 100 and the memory controller 10 is changed into the second link 30, instead of the first link 20. For example, the data transmission direction for the first operation is changed from the first direction into the second direction. Accordingly, since the first link 20 is not used any longer, the second memory device 200 may communicate with the memory controller 10 using the first sub link 20-1 of the first link 20.

Consequently, in the memory system 1 according to an exemplary embodiment of the present invention, the second memory device 200 may perform the second operation without waiting for the first operation to be completed by changing the data transmission direction for the first operation. Accordingly, the processing speed of the overall operation of the memory system 1 can be increased.

Step S1200 of FIG. 1 may further include sub-steps, which will be described with reference to FIGS. 2 to 6.

First, referring to FIGS. 2 and 4, the second memory device 200 may be in a state of waiting for performing the second operation before the first memory device 100 completes the first operation (S1210).

While the first memory device 100 perform its the first operation, a request of the second operation of the second memory device 200 may be sent to the memory controller 10.

Next, referring to FIGS. 2 and 4, the memory controller 10 may determine whether a communication path for the second operation is available (S1220).

A communication path between the second memory device 200 and the memory controller 10 may be secured prior to performing the second operation. For example, referring to FIG. 3, the first sub link 20-1 may be used as the communication path between the second memory device 200 and the memory controller 10. The second link 30 and the second sub link 20-2 may be used as communication paths between the second memory device 200 and the memory controller 10.

Referring to FIG. 4, since the first operation is not completed, the first sub link 20-1 and the second sub link 20-2 are used as communication paths between the first memory device 100 and the memory controller 10. Therefore, the memory controller 10 may determine that the communication path for the second operation is not available.

If the memory controller 10 determines that the communication path for the second operation is available, the second memory device 200 may perform the second operation using the communication path and the next step (S1230) is not executed. However, as shown in FIG. 4, since the memory controller 10 determines that the communication path for the second operation is not available, the next step (S1230) may be executed.

Referring to FIGS. 2 and 4, if the communication path 1000-1 for the first operation is changed, the memory controller 10 determines whether the communication path for the second operation is not available (S1230).

For example, the memory controller 10 may execute an algorithm for searching for the communication path for the second operation. When the first link 20 is used as a communication path 1000-1 for the second operation between the first memory device 100 and the memory controller 10, the communication path for the second operation is not available. Therefore, if the memory controller 10 changes the communication path 1000-1 between the first memory device 100 and the memory controller 10 and changes a transmission direction of the signal between the first memory device 100 and the memory controller 10, the availability of the communication path for the second operation is determined.

In a network structured in a ring topology, two different communication paths may exist between two nodes. The two different communication paths may transmit signals between the two nodes in different directions.

For example, as shown in FIG. 4, the first link 20 may be used as the communication path 1000-1 between the first memory device 100 and the memory controller 10, but aspects of the present invention are not limited thereto. Alternatively, the second link 30 may also be used as a communication path between the first memory device 100 and the memory controller 10. Even if the same signal is transmitted between the first memory device 100 and the memory controller 10, signal transmission directions may be opposite to each other when the first link 20 is used and when the second link 30 is used.

Therefore, assuming that the second link 30 is used as the communication path between the first memory device 100 and the memory controller 10, the memory controller 10 may determine whether the communication path between the second memory device 200 and the memory controller 10 is available. In this case, the first sub link 20-1 may be used as the communication path between the second memory device 200 and the memory controller 10.

Even if the communication path for the first operation is changed and the memory controller 10 determines that the communication path for the second operation is not available, the second operation may be performed after the first operation is completed. However, as shown in FIG. 4, if the communication path 1000-1 for the first operation is changed and the memory controller 10 determines that the communication path for the second operation is available, the next step (S1240) can be executed.

Referring to FIGS. 2 and 3, the first memory device 100 may temporarily halt the first operation (S1240).

For example, the memory controller 10 may transmit a "switch direction command" to the first memory device 100. If the first memory device 100 receives the "switch direction command," the first memory device 100 may temporarily halt the first operation for a predetermined time. Therefore, the signal transmission between the first memory device 100 and the memory controller 10 may be temporarily halted for a predetermined time.

Figure 5:
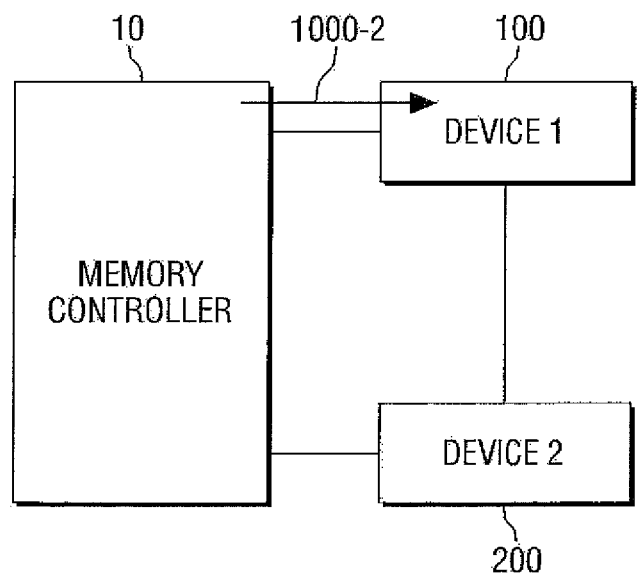

Next, referring to FIGS. 2 and 5, the first memory device 100 resumes the first operation and the communication path 1000-2 for the first operation may be changed (S1250).

For example, the performing of the first operation may be resumed with a predetermined time elapsed after the first memory device 100 receives the "switch direction command," but aspects of the present invention are not limited thereto. Alternatively, the memory controller 10 may transmit a separate command for resuming the performing of the first operation to the first memory device 100.

If the performing of the first operation is resumed, the communication path 1000-2 and the signal transmission direction between the first memory device 100 and the memory controller 10 may be changed. For example, the second link 30, rather than the first link 20, may be used as the communication path 1000-2 between the first memory device 100 and the memory controller 10. In addition, unlike in a case where the first operation is a write operation, in which data is transmitted in a first direction using the first link 20, the data may be transmitted in a second direction using the second link 30.

Referring to FIGS. 2 and 6, the second operation of the second memory device 200 may be resumed before the first operation is completed (S1260).

For example, in the middle of performing the first operation of the first memory device 100, the second operation of the second memory device 200 may be started. The first link 20, for example, the first sub link 20-1, may be used as the communication path 1100 between the second memory device 200 and the memory controller 10. For example, while a signal is transmitted between the first memory device 100 and the memory controller 10 using the second link 30, the signal may also be transmitted between the second memory device 200 and the memory controller 10 using the first sub link 20-1.

Figure 7:
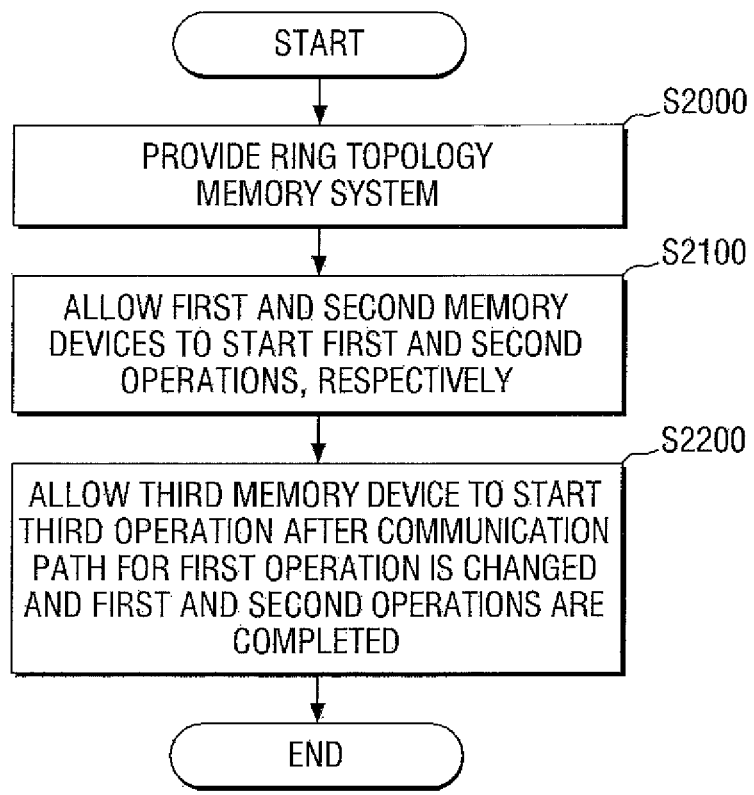
FIG. 7 is a flowchart illustrating a method for operating a memory system according to exemplary embodiments of the present invention.
Figure 8:
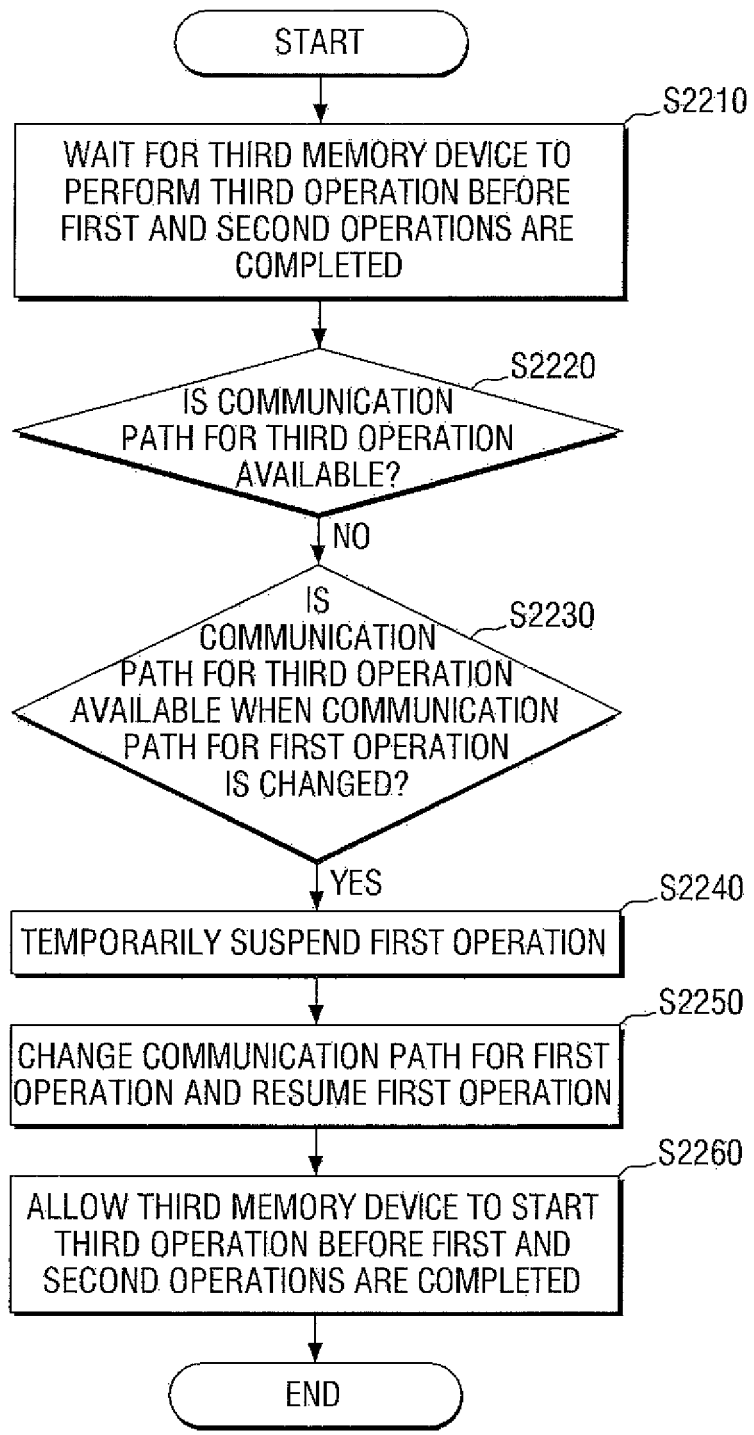
FIG. 8 is a flowchart illustrating Step S2200 of FIG. 7.

A method for operating a memory system according to an exemplary embodiment of the present invention will now be described with reference to FIGS. 7 to 13. The following description may focus on differences between the methods already discussed thus far and it may be assumed that features not discussed again may be similar to or identical to what has already been discussed. FIG. 7 is a flowchart illustrating a method for operating a memory system according to an exemplary embodiment of the present invention. FIG. 8 is a flowchart illustrating Step S2200 of FIG. 7 FIGS. 9 to 13 illustrate memory systems for performing the method for operating a memory system according to an exemplary embodiment of the present invention.

Figure 9:
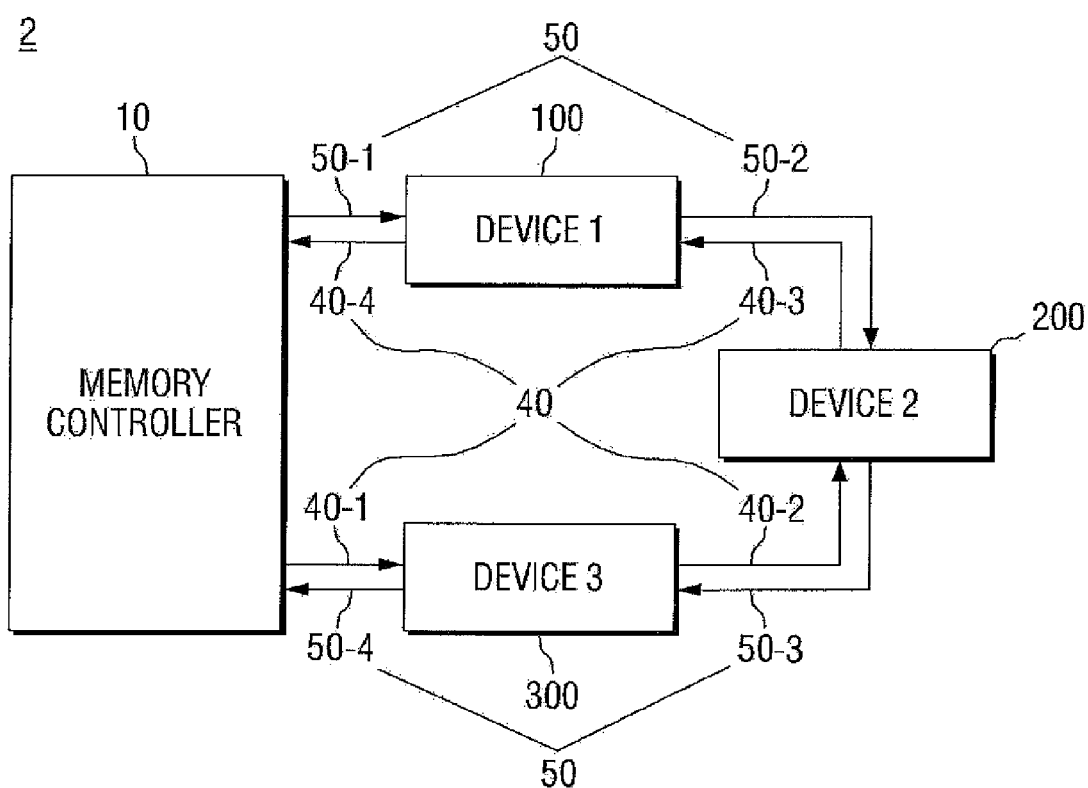
FIGS. 9 to 13 illustrate memory systems for performing a method for operating a memory system according to exemplary embodiments of the present invention.
Figure 10:
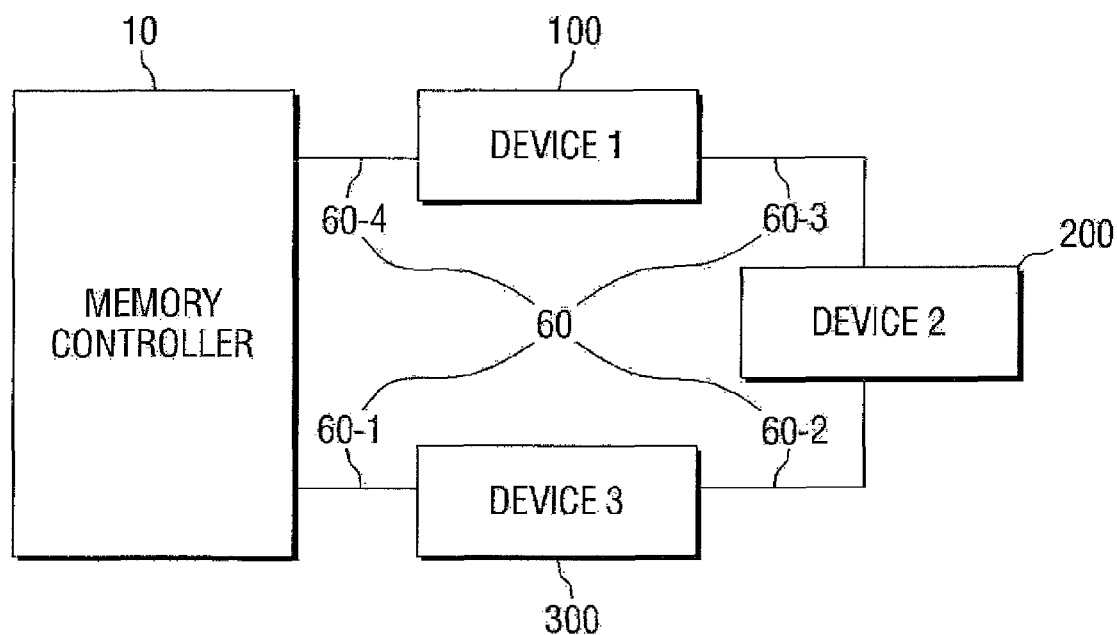

First, referring to FIGS. 7 and 9, a multi-ring topology memory system 1 is provided (S2000).

The memory system 2 includes a memory controller 10 and first to third memory devices 100, 200 and 300, constituting a multi-ring topology. The memory controller 10 may be connected to a first ring type link 40 having first directionality and a second ring type link 50 having second directionality opposite to the first directionality. The first to third memory devices 100, 200 and 300 may be positioned on the first ring type link 40 and the second ring type link 50.

The first ring type link 40 has a ring type structure and may be defined as a communication path whose start and end points are both connected to the memory controller 10. However, the first ring type link has first directionality and may transmits a signal in a first direction (e.g., in a counterclockwise direction).

The first ring type link 40 may include first to fourth sub ring type links 40-1, 40-2, 40-3, and 40-4. The first sub ring type link 40-1 may be defined as a communication path between the memory controller 10 and the third memory device 300. The second sub ring type link 40-2 may be defined as a communication path between the third memory device 300 and the second memory device 200. The third sub ring type link 40-3 may be defined as a communication path between the second memory device 200 and the first memory device 100. The fourth sub ring type link 40-4 may be defined as a communication path between the first memory device 100 and the memory controller 10. However, the memory system 2 of the present invention is not limited to that shown in FIG. 9, and each of the first to fourth sub links 40-1, 40-2, 40-3 and 40-4 may include a plurality of sub ring type links. In addition, different memory devices may be positioned on the first to fourth sub links 40-1, 40-2, 40-3 and 40-4.

The second ring type link 50 has a ring type structure and may be defined as a communication path whose start and end points are both connected to the memory controller 10. However, the second ring type link has second directionality different from the first directionality and may transmit a signal in a second direction (e.g., in a clockwise direction). The second ring type link 50 is different from the first ring type link 40 in that it has second directionality.

The second ring type link 50 may include fifth to eighth sub ring type links 50-1, 50-2, 50-3 and 50-4. As shown in FIG. 9, the fifth to eighth sub ring type links 50-1, 50-2, 50-3 and 50-4 may be defined as communication paths between the memory controller 10 and each of the first to third memory devices 100, 200 and 300, respectively. However, the memory system 2 of the present invention is not limited to that shown in FIG. 9, and each of the fifth to eighth sub ring type links 50-1, 50-2, 50-3 and 50-4 may include a plurality of sub ring type links. In addition, different memory devices may be positioned on the fifth to eighth sub ring type links 50-1, 50-2, 50-3 and 50-4.

In the memory system 2, the memory controller 10 and the first to third memory devices 100, 200 and 300 may perform full duplex communication in which communication may occur simultaneously in both directions. For example, the first and second ring type links 40 and 50 may be communication paths for full duplex communication. However, whereas FIG. 9 separately illustrates the first and second ring type links 40 and 50 for explaining that the memory system 2 enables full duplex communication, the first and second ring type links 40 and 50 are not necessarily physically separated from each other. For example, referring to FIG. 10, a ring type link 60 including ninth to twelfth sub ring type links 60-1, 60-2, 60-3 and 60-4 may be used as a full duplex communication path.

Figure 11:
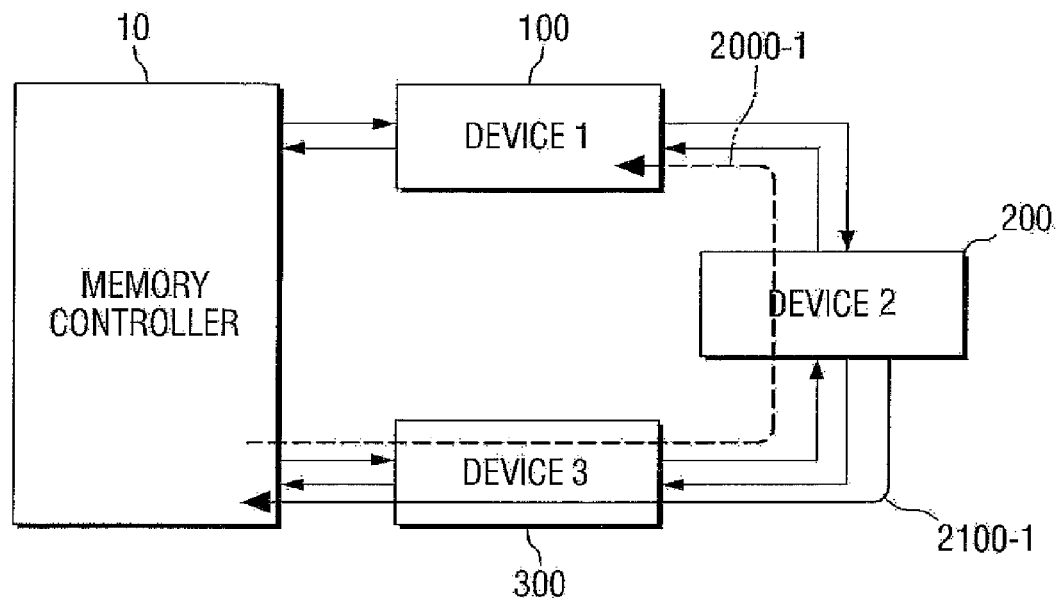

Next, referring to FIGS. 7 and 11, the first memory device 100 resumes the first operation, and the second memory device 200 starts the second operation (S2100).

For example, the first memory device 100 starts the first operation, and the memory controller 10 may be used as a communication path 2000-1 between the first memory device 100 and the first ring type link 40 having first directionality. The first operation may be either a read operation or a write operation. FIG. 11 illustrates a case in which the first operation is a write operation. For example, the memory controller 10 may transmit data to be written on the first memory device 100 in a first direction through the first to third sub ring type links 40-1, 40-2 and 40-3.

In addition, the second memory device 200 starts the first operation, and the second ring type link 50 having second directionality may be used as the communication path 2100-1 between the second memory device 200 and the memory controller 10. The second operation may be a read operation or a write operation. FIG. 11 illustrates a case in which the second operation is a read operation. For example, the second memory device 200 may transmit data to be read to the memory controller 10 in a second direction through seventh and eighth sub ring type links 50-3 and 50-4.

Next, referring to FIGS. 7 to 13, a communication path 2000-2 for the first operation is changed, and the third memory device 300 starts a third operation before the first operation and the second operation are completed (S2200).

For example, the first memory device 100 performs the first operation, and the communication path 2000-2 between the first memory device 100 and the memory controller 10 may be changed. For example, the second ring type link 50 may be used as the communication path 2000-2 between the first memory device 100 and the memory controller 10. Since the second ring type link 50 has second directionality different from first directionality, a signal transmission direction between the first memory device 100 and the memory controller 10 may be changed from the first direction to the second direction.

While the second memory device 200 performs the second operation, the communication path 2100-1 between the second memory device 200 and the memory controller 10 may not be changed, but aspects of the present invention are not limited thereto. Alternatively, the communication path 2100-1 between the second memory device 200 and the memory controller 10 may be changed, which is described in detail below.

In addition, a third memory device 300 starts the third operation and the first to third operations may be simultaneously performed before the first and second memory devices 100 and 200 complete the first and second operations, respectively. The third operation may either be a read operation or a write operation, and the following description will be made with regard to a case in which the third operation is a write operation. The first ring type link 40 may be used as a communication path 2200 between the third memory device 300 and the memory controller 10. For example, the first sub ring type link 40-1 of the first ring type link 40 may be used as a communication path 2200 between the third memory device 300 and the memory controller 10.

Effects of the memory system 2 according to an exemplary embodiment of the present invention will be described with reference to FIGS. 11 and 13.

Referring to FIG. 11, in a case where the third operation is a write operation, the third memory device 300 may perform communication using the first sub ring type link 40-1 of the first ring type link 40. The third memory device 300 may also perform communication using the fifth to seventh sub ring type links 50-2, 50-3 and 50-4 of the second ring type link 50. However, the first sub ring type link 40-1 is used as the communication path 2000-1 for the first operation, and the seventh sub ring type link 50-3 is used as the communication path 2100-1 for the second operation. Therefore, since the third memory device 300 cannot secure a path enabling communication with the memory controller 10, the write operation may not be performed.

Figure 13:
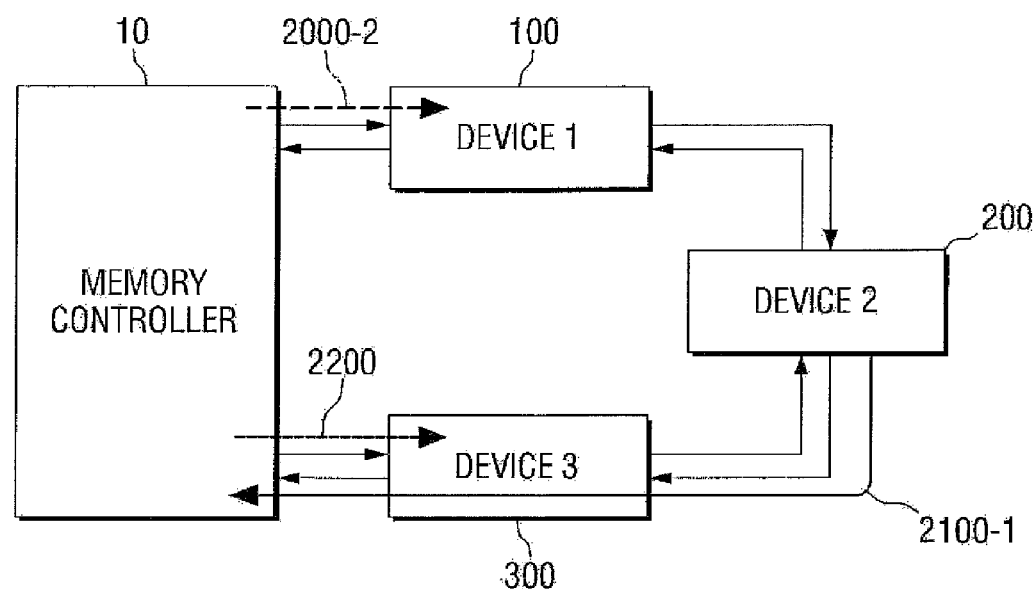

However, referring to FIG. 13, the communication path 2000-2 between the first memory device 100 and the memory controller 10 is changed into the second ring type link 50, rather than the first ring type link 40. Since the first ring type link 40, specifically, the first sub ring type link 40-1, is not used as the communication path 2000-2 between the first memory device 100 and the memory controller 10, the third memory device 300 may perform communication with the memory controller 10 using the first sub ring type link 40-1 of the first ring type link 40. Therefore, the third memory device 300 is able to perform the third operation.

Consequently, in the memory system 2 according to an exemplary embodiment of the present invention, the third memory device 300 may perform the second operation without waiting for the first and second operations to be completed by changing the data transmission direction for the first operation. Accordingly, the processing speed of the overall operation of the memory system 2 can be increased.

Step S2200 of FIG. 7 may further include sub steps, which will be described in detail with reference to FIGS. 8 to 13.

First, referring to FIGS. 8 and 11, the third memory device 300 may be in a state of waiting for performing the third operation before the first and second operations are completed (S2210).

Next, referring to FIGS. 8 and 11, the memory controller 10 may determine whether a communication path for the third operation is available (S2220).

In performing the third operation, a communication path between the third memory device 300 and the memory controller 10 may be secured. However, referring to FIG. 11, the memory controller 10 may determine that the communication path for the third operation, which is a write operation, is not available.

Next, referring to FIGS. 8 and 11, if the communication path 2000-1 for the first operation is changed, the availability of a communication path for the third operation is determined (S2230). When necessary, it may also be determined whether a communication path for the third operation is available. This determination may be made, for example in a case where a communication path for the second operation is changed.

According to the exemplary embodiment of the present invention shown in FIG. 11, if the memory controller 10 changes the communication path 2000-1 for the first operation, it is determined that the communication path for the third operation is not available and the next step (S2240) may be executed.

Next, referring to FIGS. 8 and 9, the first memory device 100 may temporarily halt the first operation (S2240).

For example, the memory controller 10 may transmit a "switch direction command" to the first memory device 100. If the first memory device 100 receives a "switch direction command," the first memory device 100 may temporarily halt the first operation for a predetermined time. Therefore, the signal transmission between the first memory device 100 and the memory controller 10 may be temporarily halted for a predetermined time.

If the communication path for the second operation needs to be changed, the memory controller 10 may transmit a "switch direction command" to the second memory device 200 to temporarily halt the second operation of the second memory device 200 for a predetermined time.

Figure 12:
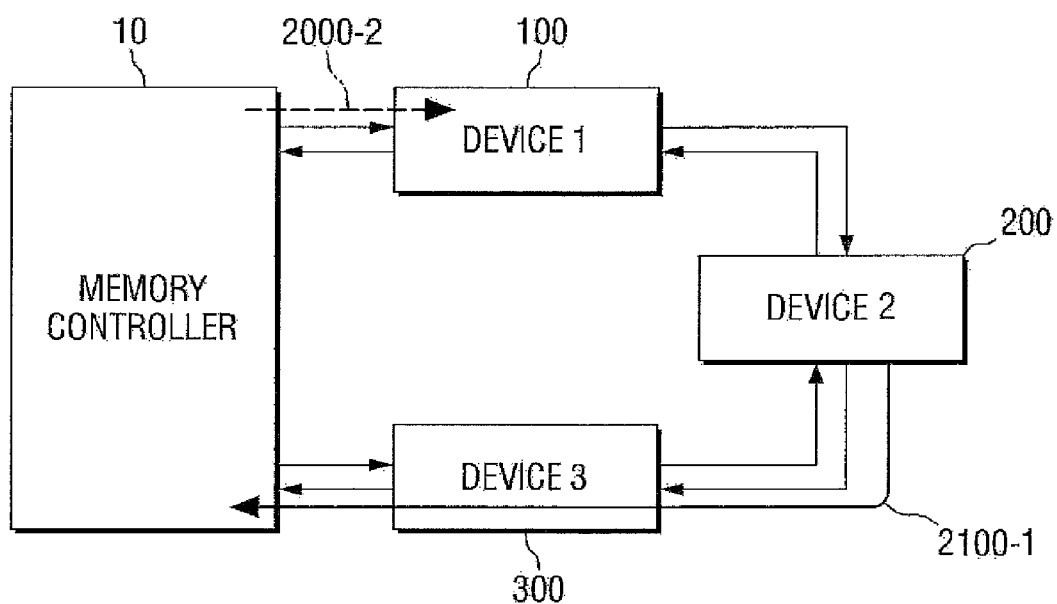

Next, referring to FIGS. 8 and 12, the first memory device 100 resumes the first operation, the communication path 2000-2 for the first operation may be changed (S2250).

If the performing of the first operation is resumed, the signal transmission direction between the first memory device 100 and the memory controller 10 may be changed. For example, the second ring type link 50, rather than the first ring type link 40, may be used as the communication path 2000-2 between the first memory device 100 and the memory controller 10. Unlike in a case where the first operation is a write operation, in which data is transmitted in a first direction using the first ring type link 40, the data may be transmitted in a second direction using the second ring type link 50.

Alternatively, if a communication path for the second operation needs to be changed, the second memory device 200 resumes the second operation, and the communication path for the second operation may be changed.

Next, referring to FIGS. 8 and 13, the third operation of the third memory device 300 may be started before the first and second operations are completed (S2260).

For example, while the first and second memory devices 100 and 200 perform the first and second operations, respectively, the third memory device 300 may start the third operation. The first ring type link 40, specifically, the first sub ring type link 40-1, may be used as a communication path 2200 between the third memory device 300 and the memory controller 10.

Figure 14:
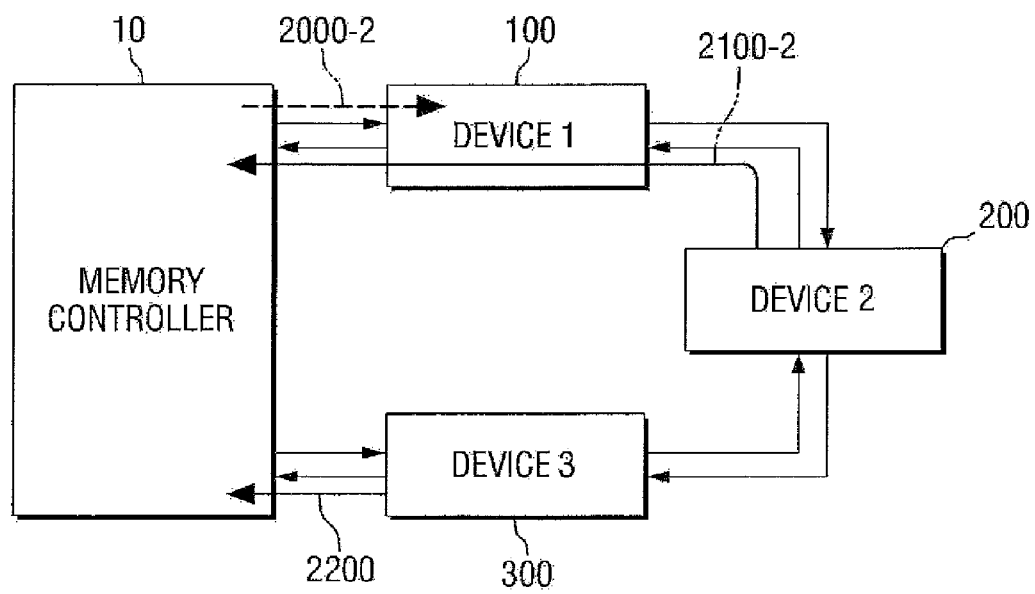
FIG. 14 is a flowchart illustrating a method for operating a memory system according to exemplary embodiments of the present invention.

A method for operating a memory system according to an exemplary embodiment of the present invention will now be described with reference to FIGS. 7 to 11 and FIG. 14. However, the following description may focus on differences between a current method and the methods already described and accordingly, it may be assumed that features not described again may be similar to or identical to features already described. FIG. 14 is a flowchart illustrating a method for operating a memory system according to an exemplary embodiment of the present invention.

In the method for operating a memory system according to an exemplary embodiment of the present invention, a communication path for the first operation is changed and a communication path for the second operation may also need to be changed to perform the third operation of the third memory device 300.

For example, referring to FIG. 14, when the third operation is a read operation, a communication path 2000-2 between the first memory device 100 and the memory controller 10 is changed from the first ring type link 40 to the second ring type link 50 and the communication path 2100-2 between the second memory device 200 and the memory controller 10 is changed from the second ring type link 50 to the first ring type link 40. However, the third memory device 300 may perform communication with the memory controller 10 using an eighth sub ring type link 50-4.

While exemplary embodiments of the present invention have been particularly shown and described with reference to the accompanying figures, it will be understood by those of ordinary skill in the art that various changes in form and details may be made to the exemplary embodiments described herein without departing from the spirit and scope of the present invention.

What is claimed is:

1. A method for operating a memory system, the method comprising:
    initiating a first operation in a first memory device using a memory controller that is in communication with said first memory device through a first link and a second link different from said first link, said first operation using said first link as its communication path for transmitting data back and forth between the memory controller and the first memory device; and
    initiating a second operation in a second memory device using the memory controller that is in communication with said second memory device through the first link and the second link,
    wherein said initiation of said second operation occurring before the first memory device completes said first operation,
    wherein said communication path for transmitting data back and forth between the memory controller and the first memory device of said first operation is changed from said first link to said second link during a pendency of the first operation, and
    wherein said second operation uses said first link as its communication path for transmitting data back and forth between the memory controller and the second memory device while said first operation simultaneously uses said second link as its communication path for transmitting data back and forth between the memory controller and the first memory device.

2. The method of claim 1, wherein when the first link is used as a communication path between the first memory device and the memory controller, a signal between the first memory device and the memory controller is transmitted in a first direction, and when the communication path between the first memory device and the memory controller is changed into the second link, a signal between the first memory device and the memory controller is transmitted in a second direction different from the first direction.

3. The method of claim 1, wherein the communication path between the first memory device and the memory controller is changed into the second link before the second memory device starts the second operation.

4. The method of claim 3, further comprising:
    temporarily halting the first operation before the communication path between the first memory device and the memory controller is changed into the second link; and
    allowing the first memory device to resume the first operation after a predefined time is elapsed.

5. The method of claim 1, wherein the first link and the second link are half duplex communication paths.

6. The method of claim 1, wherein the first link and the second link are full duplex communication paths.

7. The method of claim 6, wherein the first link includes a first sub ring type link having first directionality and a second sub ring type link having second directionality, the second link includes a third sub ring type link having the first directionality and a fourth sub ring type link having the second directionality, the first and third sub ring type links constituting a first ring type link having the first directionality, and the second and fourth sub ring type links constituting a second ring type link having the second directionality.

8. The method of claim 7, wherein when the first memory device starts the first operation, the first sub ring type link of the first link is used as the communication path between the first memory device and the memory controller, and the communication path between the first memory device and the memory controller is changed into the fourth sub ring type link of the second link.

9. The method of claim 1, wherein the first operation is either a read operation or a write operation, and the second operation is either a read operation or a write operation.

10. A memory system, comprising:
    a memory controller;
    a first memory device; and
    a second memory device,
    wherein said memory controller is connected to said first memory device along a first link and a second link different from said first link,
    wherein said memory controller is connected to said second memory device along said first link and said second link,
    wherein said memory controller is configured to initiate a first operation in said first memory device along said first link for transmitting data back and forth between the memory controller and the first memory device, switch said first operation from said first link to said second link for transmitting data back and forth between the memory controller and the first memory device during a pendency of the first operation, and initiate a second operation in said second memory device along said first link for transmitting data back and forth between the memory controller and the first memory device before said first operation has completed, and
    wherein said first operation uses said second link as its communication path while said second operation simultaneously uses said first link as its communication path.

11. The memory system of claim 10, wherein said memory controller, said first memory device, and said second memory device are arranged in a ring topology.

12. The memory system of claim 10, wherein said first and second links are each half duplex communications paths.

13. The memory system of claim 10, wherein said first and second links are each full duplex communications paths.

14. The memory system of claim 10, wherein said first link includes a first sub ring type link having first directionality and a second sub ring type link having second directionality, the second link includes a third sub ring type link having the first directionality and a fourth sub ring type link having the second directionality, the first and third sub ring type links constituting a first ring type link having the first directionality, and the second and fourth sub ring type links constituting a second ring type link having the second directionality.

\* \* \* \* \*